United States Patent [19]
Rinker

[11] 3,982,868
[45] Sept. 28, 1976

[54] CONTINUOUS MOLD THERMO FORMING

[75] Inventor: William Richard Rinker, Cuyahoga Falls, Ohio

[73] Assignee: The B. F. Goodrich Company, Akron, Ohio

[22] Filed: Oct. 14, 1975

[21] Appl. No.: 621,948

[52] U.S. Cl. .......................... 425/223; 425/326 R; 425/370; 425/373; 425/388; 425/DIG. 201; 425/307
[51] Int. Cl.² ................... B29C 13/00; B29C 15/00
[58] Field of Search ............... 425/326 R, 223, 224, 425/328, 396, 369, 370, 83, 373, 371, DIG. 200, DIG. 201, 388, 307

[56] References Cited
UNITED STATES PATENTS

| | | | |
|---|---|---|---|
| 2,446,782 | 8/1948 | Otis et al. | 425/373 X |
| 2,803,577 | 8/1957 | Colt et al. | 425/373 X |
| 3,144,376 | 8/1964 | Plumberg et al. | 425/371 X |
| 3,170,499 | 2/1965 | Deist | 425/223 X |
| 3,546,846 | 12/1970 | Sens | 425/373 X |
| 3,586,591 | 6/1971 | Munters et al. | 425/370 X |
| 3,635,631 | 1/1972 | Fields | 425/223 |

*Primary Examiner*—Robert L. Spicer, Jr.
*Attorney, Agent, or Firm*—Joseph Januszkiewicz; W. A. Shira, Jr.

[57] ABSTRACT

An apparatus for the continuous forming of molded plastic sheet from granular thermoplastic materials directly from granular thermoplastic material by plasticizing the granular material through a blender and an extruder, thence passing such material through a pair of roller dies to form a sheet of material that is fed directly to a continuously moving conveyor belt where the sheet is vacuum formed, thence trimmed and cut to size.

5 Claims, 4 Drawing Figures

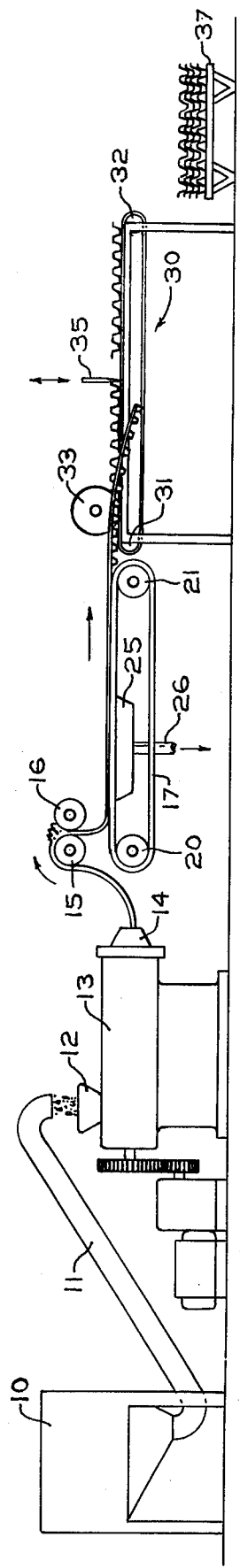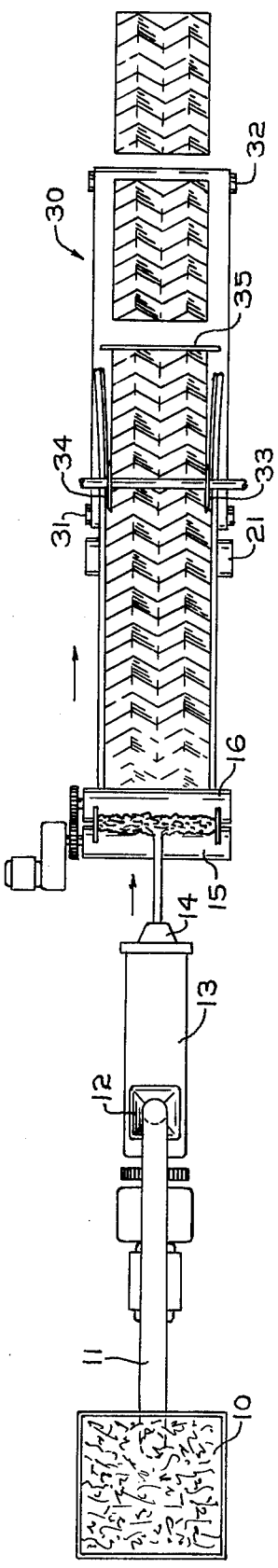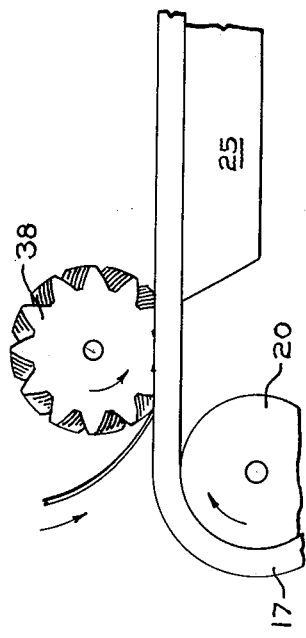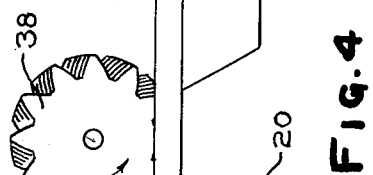

CONTINUOUS MOLD THERMO FORMING

BACKGROUND OF THE INVENTION

This invention relates to the continuous molding of thermoplastic material into a three dimensional sheet from granular form in a continuous process.

The use of vacuum forming on a moving belt has been directed to embossing a preformed sheet of material or to extruding a falling sheet or curtain of material and then embossing.

The present invention is directed to the formation of a sheet of material to be vacuum formed on a continuous moving belt by blending raw granular thermoplastic material and thence extruding such material wherein the granular material such as polyvinyl chloride is fully worked and plasticized. The extruded material is then fed to roller die means which accurately controls the dimension of the hot sheet of thermoplastic material. The conveyor belt which receives the sheet of material is made of flexible material and has a three dimensional mold formed thereon with spaced guides on the respective side portions of the belt so upon pulling of a vacuum on the mold portion of the belt, the sheet material is formed precisely into the shaped mold with clear demarcation lines. An additional roller with moldings thereon may be mounted adjacent to the roller die to assist the formation of the design on the sheet material as it is guided onto the conveyor means for vacuum forming to thereby improve the efficiency and quality of the vacuum forming.

SUMMARY OF THE INVENTION

The present invention comprises a blender that processes granular thermoplastic material for an extruder which in turn feeds the extrudate to a pair of roller dies which processes the extrudate into a thin sheet of film for passage onto an endless conveyor belt. The conveyor belt has a molded design thereon that cooperates with a vacuum former to form a finished three dimension product which is trimmed and cut to the desired dimensions.

BRIEF DESCRIPTION OF THE DRAWINGS

FIG. 1 is a side elevational view of the preferred embodiment of the continuous thermo forming machine.

FIG. 2 is a plan view of the thermo forming machine shown in FIG. 1.

FIG. 3 is an enlarged cross sectional of the finished product on the belt mold.

FIG. 4 is a fragmentary side-elevational view of a portion of the conveyor belt and vacuum forming box along with a plug assist roller illustrating a modified form of the invention.

DETAILED DESCRIPTION

Referring to the drawings, wherein like reference character designate like or corresponding parts throughout the several views, there is shown in FIG. 1 a blender 10 having a hopper with suitable mixing means therein. The mixed blend is conveyed by a suitable pump means not shown via conduit 11 to the hopper 12 of an extruder 13. The extruder 13 is provided with a die head 14 from which the extrudate issues and is guided to a pair of roller dies 15 and 16. The roller dies 15 and 16 accurately control the thickness of the formed sheet of thermoplastic material which is directed downwardly onto an endless conveyor belt mold 17. The conveyor belt moved 17 is made of a flexible material being contoured with the groove design as shown on the product in FIG. 3 with elevated side members 18-18 which facilitate the vacuum forming operation of the thermoplastic material. The conveyor belt 17 is trained over drive roller 20 and idler roller 21, which idler roller 21 is suitably adjustable to provide the required tension thereon. The conveyor belt mold 17 has a plurality of holes therethrough to provide means for exerting a vacuum onto the thermoplastic material being received by the belt. A vacuum box 25 located beneath the forwardly disposed portion of the conveying run of conveyor belt mold 17 provides the means which exerts the the suction on the thermoplastic material to shape such material into the mold design of the belt 17. A suitable vacuum pump is connected via conduit 26 to the vacuum box 25 to exert a vacuum thereon. Downstream from the conveyor belt mold 17 is a take-away conveyor 30 trained about suitable pulleys 31 and 32. Power means is provided to move the conveyor belt. A pair of laterially spaced rotary knives 33 and 34 suitably powered trim the excess stock from the formed sheet of thermoplastic material while a guilotine shear 35 suitably powered for intermittent cuts severs the formed thermoplastic material into predetermined lengths. The cut lengths of stock are stacked onto a skid 37 for packing.

In the operation, granular material such as polyvinylchloride is fed into the hoppers of the blender 10 which premixes the granular material with additives to provide a warm-up and a premixing of the raw material. The premixed blend is then conveyed to an extruder 13 which plasticates and works the material to form a homogeneous mass which is then conveyed to a pair of roller dies which shapes the material into a thin sheet of thermoplastic material for deposit onto the conveyor belt mold 17. The sheet material is wide enough to seat on the respective parallel edges of the belt mold 17 so as the vacuum is pulled in the vacuum box 25, the sheet material is shaped precisely to the desired mold since the respective edges of the material seal the lateral sides of the mold and the product is accurately reproduced. The molding operation is performed continuously during the conveying of the hot thermoplastic material and as the molded product leaves the conveyor 17 and deposited onto conveyor 30, the respective edges are trimmed to the proper size, after which the material is cut to precise lengths by a guilotine shear 35.

A modified form of the invention is shown in FIG. 4 wherein a plug assist roller 38 with a plurality of projection complementary to the valleys 39 in the finished product is rotatably mounted adjacent to the conveyor belt 17 forwardly of the vacuum box 25 wherein the rotation of the roller 38 presses the design into the hot thermoplastic material as the material enters the area of the vacuum box such as to assist the formation of the design to enhance the reproduction of the design within the conveyor belt mold 17. In the formation of the product, the roller dies 15 and 16 in cooperation with the feed supply of the extrudate from the extruder 13 is adjusted to provide a product whose width extends the full width of the design on the belt 17 and onto the respective elevated side members 18—18 on the belt to assure a sharp and precise response to the vacuum pulled onto the conveyor belt 17. Such cooperative action of the extra-width utilizes less energy and assures an accurate reproduction of the three dimensional design of the belt mold 17.

Various modifications are contemplated and may obviously be resorted to by those skilled in the art without departing from the described invention, as hereinafter defined by the appended claims, as only the preferred embodiments thereof have been disclosed.

I claim:

1. An apparatus for the continuous molding of sheet material comprising an endless flexible belt mold having a three dimensional irregular pattern with valleys formed therein, said flexible belt mold having laterally spaced side members defining the lateral limits of the belt mold, said belt mold having a plurality of spaced openings in said belt mold located in said valleys, means for moving said belt mold through an endless path having a conveying run and a return run, roller die means mounted adjacent to said belt mold operative to form and deposit a film layer onto said conveying run that extends laterally onto said spaced side members, means at one end of said conveying run for pulling a vacuum to the underside of a portion of conveying run and communicating with the openings in said belt mold, an extruder mounted adjacent to said roller dies for forming an extrudate for deposit to said roller dies, and a pair of laterally spaced knives at the other end of said conveying run operative to trim the respective side portions of the formed thin layer of material that has been vacuum formed.

2. An apparatus for the continuous molding of sheet material as set forth in claim 1 wherein a blender is mounted adjacent to said extruder for feeding premixed granular material to said extruder.

3. An apparatus for the continuous molding of sheet material as set forth in claim 2 wherein roller means is mounted at one end of said conveying run between the means for pulling a vacuum and said roller die means for engaging said sheet material fed to said conveying run, and said roller means having a plurality of projections thereon for protrusion into said valleys of said belt mold for preliminary shaping of said sheet material on said one end of said conveying run.

4. An apparatus for the continuous molding of sheet material as set forth in claim 3, wherein said projections on said roller means are complimentary to the valleys in said belt mold.

5. An apparatus for the continuous molding of sheet material as set forth in claim 4, wherein said other end of said conveying run has a guilotine shear mounted adjacent thereto for cutting said trimmed material into predetermined lengths.

* * * * *